April 27, 1965

A. HOSSACK 3,180,146

METHOD OF GAGING AND EXPELLING FLUIDS UNDER
ZERO GRAVITY CONDITIONS
Filed March 12, 1963

INVENTOR.

BY ALEXANDER HOSSACK

*Edwin L. Greigg*

United States Patent Office 3,180,146
Patented Apr. 27, 1965

3,180,146
METHOD OF GAGING AND EXPELLING FLUIDS UNDER ZERO GRAVITY CONDITIONS
Alexander Hossack, Katonah, N.Y., assignor to Simmonds Precision Products, Inc., Tarrytown, N.Y., a corporation of New York
Filed Mar. 12, 1963, Ser. No. 264,642
13 Claims. (Cl. 73—304)

This invention relates to a gaging system for stored fluids, and is particularly applicable to the gaging of fuels or oxidizers in, for example, spacecraft, under conditions of zero gravity.

In such spacecraft, the fluid propellant is frequently stored in a flexible bladder disposed within a sealed tank or housing, the propellant being expelled from the bladder as a result of the bladder being compressed by a high-pressure gas forced between the inner walls of the housing and the bladder.

It is an object of this invention to provide a fluid gaging system which is compatible with the bladder expulsion method referred to above.

It is a further object of this invention to provide a capacitance-type fluid gaging system embodied in apparatus for effecting said bladder expulsion of a propellant.

It is a further object of this invention to provide a capacitance-type gaging system employing a flexible bladder for storing fuel propellant or oxidizer, the bladder being disposed within a housing and means being provided for controlling the collapse of said bladder and the exhaustion of fuel or oxidizer therefrom.

It is a further object of this invention to provide a capacitance-type gaging system employing a flexible bladder for storing fuel propellant or oxidizer, the bladder being disposed within a housing and portions of the bladder being retained against the inner wall of the housing whereby the configuration of said bladder is controlled as the fuel is exhausted therefrom.

It is a further object of this invention to provide a capacitance-type fuel gaging system having a bladder disposed within a sealed housing and retained against the inner wall of the housing in such a manner that the configuration of the bladder is controlled when fuel is exhausted therefrom, portions of the bladder being provided with a conductive coating which portions lie opposite each other during the exhaustion of said fuel and constitute the plates of a capacitor, the capacitance of which is indicative of the quantity of fuel to the bladder.

For a better understanding of this invention as well as other objects and further features thereof reference is made to the following description to be read in conjunction with the accompanying drawing which is numeral referenced throughout.

Figure 1:
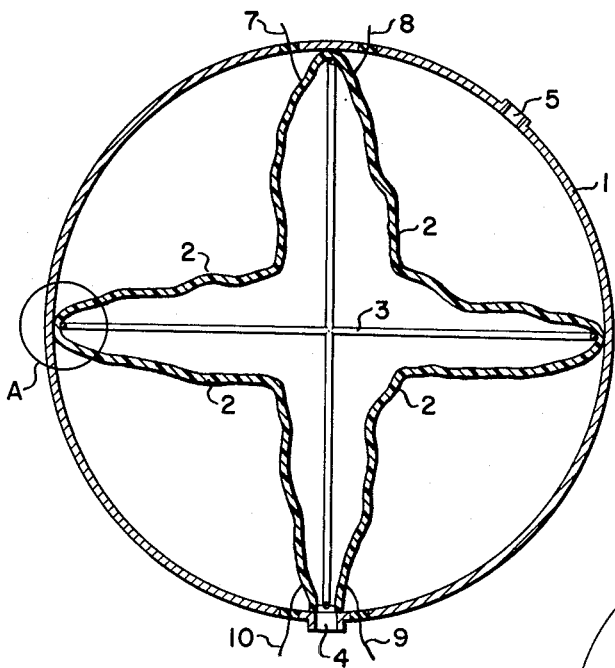
FIGURE 1 illustrates a cross-sectional view through a spherical housing in a system according to this invention, the bladder in the housing being partially deflated around the supporting ribs.

Referring now to FIGURE 1, there is shown a gaging system comprising a spherical housing 1 conveniently made from aluminum or titanium or any other material exhibiting a high strength weight ratio, a bladder 2 made of a plastic material compatible with the stored fluid, for example, the material known under the trademarks "Mylar" or "Teflon," and a pair of substantially circular hoops or ribs 3 extending internally around the housing 1.

The ribs 3 are located internally of the bladder 2 and are so disposed effectively to divide the bladder into an even number of segments, parts of the bladder 2 being held in contact with the housing 1 by these ribs.

The bladder 2 may contain, for example, a fuel propellant or an oxidizer and this is expelled through an outlet connection 4, extending from the bladder through the housing, under the compressive force of an inert gas forced between the housing 1 and the bladder 2 through an inlet connection 5. In this figure the bladder 2 is shown in a partially deflated condition, and it will be apparent that the construction must be such as to permit the gas to flow between each segment of the bladder and the housing itself.

Figure 2:
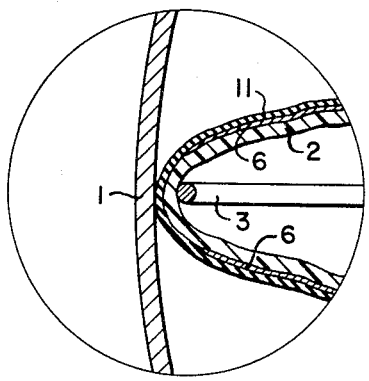
FIGURE 2 illustrates an enlarged view of the ringed portion "A" in FIGURE 1.

The portions of the bladder 2 lying between the ribs are externally coated or backed with an electrically conductive substance 6, the substance being slightly spaced from the ribs so as to constitute discrete, mutually insulated, portions, as shown in FIGURE 2.

Electrical leads 7 to 10 are connected to corresponding ones of these portions, the coatings being covered by an additional layer of insulating material 11 to prevent electrical contact between the conductive coatings and the housing 1.

The two opposing conductive portions connected to the leads 7 and 9 and the two opposing conductive portions connected to the leads 8 and 10 together form the plates of a capacitor, the dielectric of the capacitor being constituted by the propellant or the oxidizer, together with the material of which the bladder consists.

A change in capacitance is therefore indicative of a change in the quantity of the stored fluid and therefore any capacitance-measuring means may be employed to indicate said quantity.

Thus, by connecting these capacitors in a conventional capacitance bridge and providing electrical measuring means for indicating balance and unbalance conditions of said bridge, then, since the magnitude of the variable capacitance in the bridge will be dependent on the quantity of fuel or oxidizer in the bladder 2, the measuring means can readily be calibrated to provide a direct reading of such quantity.

Thus, as the fuel is expelled from, or pumped into, the bladder, a continuous indication of the quantity of fuel is provided by the measuring means.

Figure 3:
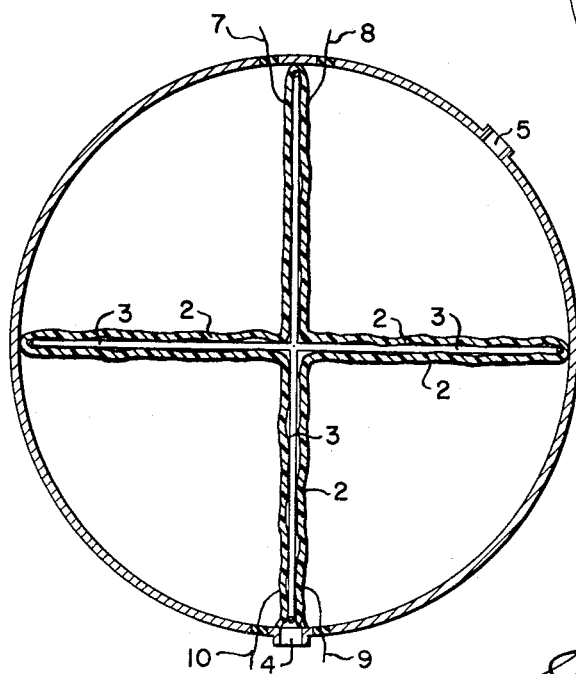
FIGURE 3 illustrates the same view as that shown in FIGURE 1 but in which the bladder has been substantially fully deflated.

In FIGURE 3 the bladder 2 is illustrated in a state in which the fuel has been completely exhausted therefrom; environmental tests have shown that at least 99% of the fuel can be exhausted in this manner.

Although FIGURE 3 shows the bladder 2 in a uniform collapsed position, it is to be understood that the bladder 2 has a larger area as a sphere resulting in some overlap of the bladder 2 in a collapsed position. However, such overlap has no effect upon the performance and results of the system.

Although there has been shown what is considered to be a preferred embodiment of the invention, it will be evident that many changes and modifications may be made without departing from the essential spirit of the invention. It is intended, therefore, in the annexed claims to cover all such changes and modifications as fall within the scope of the invention.

I claim:

1. In a system for gaging the quantity of a stored fluid,
   a sealed housing,
   a fluid-storage bladder located within said housing,
   means for securing said bladder to said housing at a plurality of spaced positions along the inner surface of said housing,
   electrically conductive means in area contact with discrete portions of said bladder spaced from and lying between said positions at which the bladder contacts the housing, and
   at least one pair of conductive leads connected to separate conductive portions of said bladder lying on opposite sides of a median plane of said bladder, the conductive portions on said opposite sides constituting the plates of a capacitor, the capacitance of which is dependent on the quantity of fluid in said bladder.

2. A system according to claim 1, comprising
   an inlet connection in said housing for the passage of control fluid into said housing, and
   an outlet connection in said bladder and extending through said housing for the passage of stored fluid from said bladder, the exhaustion of said stored fluid being governed by said control fluid.

3. A system according to claim 2, wherein said bladder is secured to the inner surface of said housing by a framework disposed within said bladder.

4. A system according to claim 3, wherein said electrically conductive means comprise metallic coatings applied to said discrete portions.

5. In a system for gaging the quantity of a stored fluid,
   a sealed housing,
   a fluid-storage bladder located within said housing,
   a framework located within said bladder and arranged to hold portions of the bladder in contact with said housing,
   electrically conductive means in area contact with parts of the outer side of said bladder extending between said portions, and electrically insulated from each other adjacent said portions, and
   conductive leads electrically connected to said electrically conductive means, whereby said electrically conductive means in contact with parts lying on opposite sides of said bladder constitute the plates of a capacitor, the dielectric of which comprises said stored fluid and the capacitance of which is dependent on the quantity of fluid in said bladder.

6. A system according to claim 5, wherein said housing is spherical and said framework comprises at least one circular hoop lying in a plane containing the centre of said housing.

7. A system according to claim 6, wherein said framework comprises a plurality of hoops lying in a like plurality of planes symmetrically disposed and each containing the centre of said spherical housing.

8. A system for gaging the quantity of a stored fluid, comprising
   a sealed housing,
   a first connection in said housing for the passage of gas into said housing,
   a fluid-storage bladder located within said housing, said bladder having
   a second connection extending from the bladder and through said housing for the passage of said fluid into and out of said bladder,
   a framework located within said bladder, said framework comprising
   at least one hoop lying in the median plane of said housing and having a shape substantially corresponding to the cross-section of said housing in said median plane, the dimensions of the hoop being such as to maintain substantial portions of the bladder in contract with said housing,
   electrically conductive coatings on said bladder, said coatings lying on opposite sides of said hoop and electrically insulated from each other adjacent said portions of the bladder,
   electrically conductive means connected to corresponding ones of said coating and each extending through and insulated from said housing, the opposing conductive coatings constituting the plates of a capacitor, the dielectric of which comprises said stored fluid and the capacitance of which is dependent on the quantity of fluid in said bladder, the fluid in said bladder being expelled in response to said gas flowing through the said first connection and compressing said bladder within the housing.

9. A system according to claim 8, wherein said electrically conductive coatings are formed on the external surface of said bladder, and wherein
   electrically insulating coatings are formed on said conductive coatings.

10. A system for gaging the quantity of a stored fluid comprising
    a sealed housing,
    an inlet connection in said housing for the passage of gas into said housing,
    a fluid-storage bladder located within said housing,
    a fluid-outlet connection in said bladder and extending through said housing for expelling fluid from said bladder in response to the pressure of gas flowing through said inlet connection,
    means for securing said bladder to said housing at a plurality of positions along the periphery of the housing and lying in a median plane thereof,
    said bladder having at least two area-like electrically conductive portions mutually insulated from each other and lying on opposite sides of said median plane, the opposing portions constituting the plates of a capacitor, the dielectric of which comprises said stored fluid and the capacitance of which is dependent on the quantity of fluid in said bladder.

11. A system according to claim 10, wherein the means for securing said bladder comprises a framework located within said bladder.

12. A system for gaging the quantity of a fluid stored under normal and zero gravity conditions comprising
    a sealed spherical housing,
    an inlet connection to said housing for the passage of gas into said housing,
    a fluid-storage bladder located within said housing,
    a fluid-outlet connection in said bladder and extending through said housing for expelling fluid from said bladder in response to gas flowing though said inlet connection and forced between said housing and said bladder,
    a framework located within said bladder and comprising
    at least two hoops perpendicular to each other and each lying in a median plane of the housing, the shape and dimensions of each hoop being such as to maintain substantial portions of said bladder in the said median plane in contact with the housing,
    conductive areas in contact with the external surface of said bladder and lying between, and spaced from, the portions of said bladder in contact with the housing, and
    electrically conductive leads connected to corresponding ones of said areas and each extending through, and insulated from, said housing, whereby the conductive areas lying on opposite sides of said bladder constitute the plates of a capacitor, the dielectric of which comprises said stored fluid and the capacitance of which is dependent on the quantity of fluid in said bladder.

13. A system according to claim 12 wherein said conductive areas comprise metallic coatings on said bladder and wherein
   an electrically insulating coating is applied over said metallic coating.

References Cited by the Examiner

UNITED STATES PATENTS

| | | | |
|---|---|---|---|
| 2,042,490 | 6/36 | Zahl | 317—246 |
| 2,637,999 | 5/53 | Kleeba | 73—301 |
| 2,642,091 | 6/53 | Morin | 92—90 |
| 2,649,579 | 8/53 | Alexander | 317—246 |
| 3,031,928 | 5/62 | Kopito | 73—398 |

FOREIGN PATENTS 584,673   5/30   Germany.

ISAAC LISANN, *Primary Examiner.*